United States Patent
Poo et al.

(10) Patent No.: US 8,423,789 B1
(45) Date of Patent: Apr. 16, 2013

(54) KEY GENERATION TECHNIQUES

(75) Inventors: Tze Lei Poo, Sunnyvale, CA (US);
Gregory Burd, San Jose, CA (US);
Phuc Thanh Tran, Fremont, CA (US);
Saeed Azimi, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 528 days.

(21) Appl. No.: 12/125,670

(22) Filed: May 22, 2008

Related U.S. Application Data

(60) Provisional application No. 60/939,400, filed on May 22, 2007.

(51) Int. Cl.
*G06F 21/00* (2006.01)

(52) U.S. Cl.
USPC .............................. 713/189; 713/193; 380/44

(58) Field of Classification Search .................. 713/189, 713/193; 380/44
See application file for complete search history.

(56) References Cited

U.S. PATENT DOCUMENTS

| | | | | |
|---|---|---|---|---|
| 5,467,398 A * | 11/1995 | Pierce et al. | ..................... | 380/44 |
| 5,469,506 A * | 11/1995 | Berson et al. | .................. | 713/186 |
| 5,479,514 A | 12/1995 | Klonowski | | |
| 6,216,230 B1 * | 4/2001 | Rallis et al. | .................... | 713/185 |
| 6,389,538 B1 | 5/2002 | Gruse et al. | | |
| 6,473,861 B1 * | 10/2002 | Stokes | .......................... | 713/193 |
| 6,799,271 B2 * | 9/2004 | Kugai | ........................... | 713/168 |
| 7,010,808 B1 * | 3/2006 | Leung et al. | ..................... | 726/26 |
| 7,035,827 B2 | 4/2006 | Ezaki | | |
| 7,206,940 B2 | 4/2007 | Evans et al. | | |
| 7,210,038 B2 | 4/2007 | Walmsley | | |
| 7,370,349 B2 * | 5/2008 | Holvey et al. | ...................... | 726/5 |
| 7,373,506 B2 | 5/2008 | Asano et al. | | |
| 7,376,976 B2 | 5/2008 | Fierstein et al. | | |
| 7,511,636 B2 * | 3/2009 | Takahashi | ........................ | 341/50 |
| 7,522,726 B2 * | 4/2009 | Ishiguro et al. | ................. | 380/46 |
| 7,536,558 B2 * | 5/2009 | Neble et al. | .................... | 713/189 |
| 7,549,056 B2 * | 6/2009 | Carr | .............................. | 713/189 |
| 7,676,040 B2 | 3/2010 | Augenstein et al. | | |
| 7,725,738 B1 * | 5/2010 | Langhammer et al. | ........ | 713/191 |
| 7,743,260 B2 * | 6/2010 | Fetik | ............................. | 713/193 |
| 7,747,862 B2 | 6/2010 | Ovadia | | |
| 7,831,825 B2 | 11/2010 | Milliken et al. | | |
| 7,865,733 B2 | 1/2011 | Goto et al. | | |
| 7,900,060 B2 * | 3/2011 | Hodzic | ........................... | 713/193 |
| 7,913,085 B2 | 3/2011 | Fascenda et al. | | |
| 7,991,943 B2 * | 8/2011 | Berenbaum et al. | .......... | 711/103 |
| 8,135,949 B2 | 3/2012 | McLean et al. | | |
| 2003/0156715 A1 | 8/2003 | Reeds, III et al. | | |
| 2003/0188162 A1 * | 10/2003 | Candelore et al. | ............ | 713/169 |

(Continued)

OTHER PUBLICATIONS

Dave Anderson, "HDD Based Full Disc Encryption"; www.thic.org; XP0023459119; Feb. 28-Mar. 1, 2006.*

(Continued)

*Primary Examiner* — Edan Orgad
*Assistant Examiner* — James Turchen

(57) ABSTRACT

In one or more embodiments, an integrated circuit includes a programmable memory, a key generation module and a module. The programmable memory is to maintain a first key portion. The key generation module is to generate a key using the first key portion from the programmable memory and a second key portion received via a memory interface. The module is to encrypt or decrypt data using the key.

20 Claims, 10 Drawing Sheets

U.S. PATENT DOCUMENTS

| | | |
|---|---|---|
| 2003/0210788 A1 | 11/2003 | Billhartz et al. |
| 2004/0030909 A1* | 2/2004 | Sako et al. .................. 713/193 |
| 2004/0187001 A1* | 9/2004 | Bousis .......................... 713/175 |
| 2005/0114686 A1* | 5/2005 | Ball et al. ..................... 713/193 |
| 2005/0144468 A1 | 6/2005 | Northcutt et al. |
| 2005/0207580 A1 | 9/2005 | Milliken et al. |
| 2006/0090084 A1* | 4/2006 | Buer ............................. 713/189 |
| 2006/0233149 A1* | 10/2006 | Rustagi et al. ................ 370/342 |
| 2006/0285686 A1 | 12/2006 | Van Den Heuvel et al. |
| 2007/0150756 A1* | 6/2007 | Kudelski ....................... 713/194 |
| 2007/0180271 A1* | 8/2007 | Hatakeyama et al. ........ 713/193 |
| 2008/0082837 A1 | 4/2008 | Mattsson |
| 2008/0091944 A1 | 4/2008 | von Mueller et al. |
| 2008/0137652 A1 | 6/2008 | Herrmann et al. |
| 2008/0273537 A1 | 11/2008 | Meylan et al. |
| 2009/0024846 A1 | 1/2009 | Ganesan et al. |

OTHER PUBLICATIONS

"Final Office Action", U.S. Appl. No. 12/125,693, (Jun. 9, 2011), 9 pages.

"Non-Final Office Action", U.S. Appl. No. 12/125,693, (Dec. 20, 2010), 7 pages.

"Final Office Action", U.S. Appl. No. 12/125,693, (Mar. 1, 2012), 8 pages.

"Non-Final Office Action", U.S. Appl. No. 12/125,693, (Oct. 3, 2011), 7 pages.

"Non-Final Office Action", U.S. Appl. No. 12/876,639, (Jul. 26, 2012), 8 pages.

\* cited by examiner

KEY GENERATION TECHNIQUES

RELATED APPLICATION

This application claims priority under 35 U.S.C. §119(e) to U.S. Provisional Application Ser. No. 60/939,400, filed on May 22, 2007, the entire disclosure of which is hereby incorporated by reference in its entirety.

TECHNICAL FIELD

The subject matter of this patent application relates to data processing.

BACKGROUND

The importance and value of secure data storage is ever increasing. For example, data may be stored that is sensitive to one or more users, such as confidential business information (e.g., business ledgers, contact lists), personally identifiable information (e.g., full legal name, social security number, birthday), financial information (e.g., banking account numbers, billing addresses), and so on. Consequently, as the value of this data increases so does the motivation for malicious parties to gain unauthorized access to this data.

Encryption and decryption techniques were developed to protect data. These techniques typically use a "key" to encrypt or decrypt data using one or more algorithms. For example, data encrypted with a particular key may then be accessed using the same key (e.g., using symmetrical encryption/decryption techniques) or a different key (e.g., using asymmetrical techniques that use a private key/public key pair).

Use of some traditional encryption techniques, however, may cause the key to be exposed, which may enable a malicious party to gain unauthorized access to the encrypted data. Additionally, as previously described, because the value of the data that is protected is ever increasing, so too is the sophistication of techniques employed by malicious parties to gain access to the data. Therefore, traditional techniques that do not address the increasing sophistication of malicious parties may result in exposure of the data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, an integrated circuit comprises a programmable memory, a key generation module and a module. The programmable memory is to maintain a first key portion. The key generation module is to generate a key using the first key portion from the programmable memory and a second key portion received via a memory interface. The module is to encrypt or decrypt data using the key.

In one or more other embodiments, a method is performed by an integrated circuit. The method includes receiving a first key portion from a programmable memory of the integrated circuit and receiving a second key portion via a memory interface of the integrated circuit. A key is generated using the first key portion and the second key portion and data is encrypted or decrypted using the key.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Encryption and decryption techniques were developed to protect data from malicious parties. For example, a hard disk drive may be configured to encrypt data using a key and a traditional encryption algorithm. In some traditional implementations, however, the key may be stored in memory (e.g., flash memory) that may be "snooped" by a malicious party. For example, in one traditional technique firmware is used to generate the key, which is then stored in flash memory that may be compromised, such as by taking apart a chip package and scanning the flash memory in an attempt to locate the key.

Techniques are described to generate a key, which may be used in conjunction with encryption and/or decryption techniques. For example, a key may be generated by hardware from two or more portions, e.g., a first key portion and a second key portion and/or additional portions. One or more of the portions (e.g., the first key portion), for instance, may be stored in programmable memory while at least one of the other portions (e.g., the second key portion) may be stored in a different memory such as a flash memory. The portions may then be combined using a key generation algorithm (e.g., implemented by a key generation module) for use by an encryption and/or decryption module. Thus, in this example a "complete" key is not stored by a system that incorporates this technique that could be scanned or read when the system is powered down, thereby preventing "snooping" of flash memory to obtain the key that was a concern using traditional techniques. A variety of other examples are also contemplated, further discussion of which may be found in relation to the following sections.

In the discussion that follows, example operating environments are described that may incorporate the key generation techniques. Example procedures are also described that may be employed in the example operating environments, as well as other environments. Thus, in instances in the discussion of the example procedures reference will be made to the example environments by way of example. Therefore, implementation of the example procedures is not limited to the example environments.

Example Operating Environment

Figure 1:
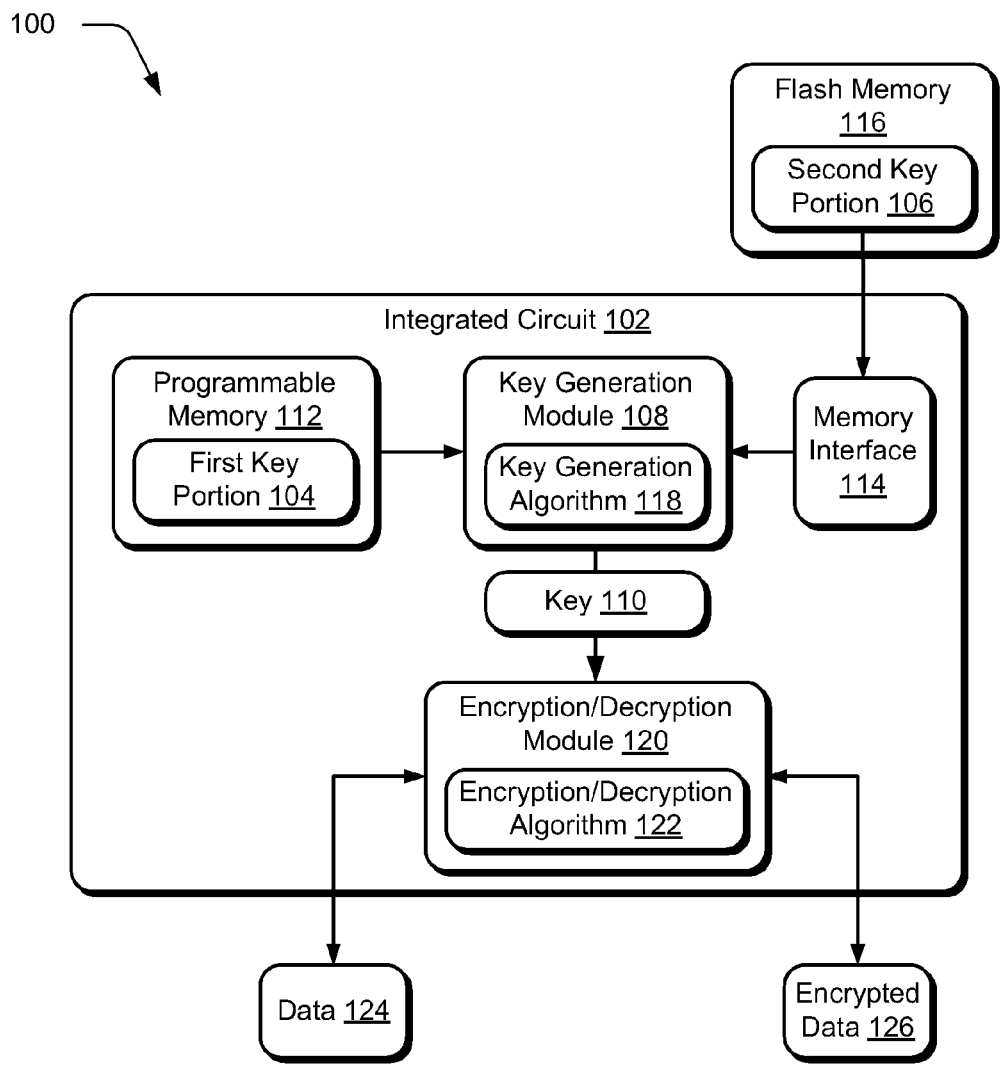
FIG. 1 is an illustration of an example operating environment that is configured to employ one or more key generation techniques.

FIG. 1 illustrates an example operating environment 100 that is configured to employ one or more key generation techniques. The illustrated operating environment 100 includes an integrated circuit 102 that has access to a first key portion 104 and one or more additional key portions such as the illustrated second key portion 106 for use by a key generation module 108 to generate a key 110. The additional key portions may be obtained from a variety of sources, such as other flash, external from a host (e.g., a smartcard), and so on.

The first key portion 104 is illustrated as being stored in programmable memory 112 that is included as a part of the integrated circuit 102. The programmable memory 112 may be configured in a variety of ways. For example, the programmable memory 112 may be configured as one-time-programmable memory that may not be changed once data is written to the memory. The first key portion 104 may be configured in a variety of ways, such as by using a serial number or other data input by a variety of entities, further discussion of which may be found in relation to FIG. 2.

The second key portion 106 is accessible by the key generation module 108 through a memory interface 114 of the integrated circuit 102. In the illustrated example operating environment 100, the key generation module 108 may receive the second key portion 106 from flash memory 116 via the memory interface 114 that is "outside" (e.g., external) of the integrated circuit 102, e.g., on another integrated circuit in a circuit package. Although flash memory 116 is described, a variety of other types of memory may also be accessed by the memory interface 114.

In the illustrated embodiment, the key generation module 108, which may be implemented via hardware, is representative of functionality to employ a key generation algorithm 118 to generate the key 110 from the first and second key portions 104, 106, respectively. The key generation algorithm 118 may be representative of a wide variety of key generation techniques, such as an "XOR" operation, one or more National Institute of Standards and Technology (NIST) Standards for Advanced Encryption Standard (AES) key generation, and so on. Although the key generation module 108 of the example environment 100 of FIG. 1 is described as being implemented via hardware of the integrated circuit 102, a variety of other implementations are also contemplated such as firmware, firmware/hardware, and so on.

The key 110 generated by the key generation module 108 is illustrated in FIG. 1 as being passed to an encryption/decryption module 120. The encryption/decryption module 120, may then store the key 110, e.g., in volatile memory. For instance, the key 110 may be stored within hardware which is used to implement and/or is accessible by the encryption/decryption module 120 such that the key 110 is difficult to "snoop", e.g., by cutting traces of flash memory as possible using traditional techniques. Thus, in this implementation the key 110 "exists" when the integrated circuit 102 is operational (e.g., "running") and does not exist otherwise, thereby preventing snooping of the key 110 when the integrated circuit 102 is not in an operational state.

The encryption/decryption algorithm 122 of the encryption/decryption module 120 may then use the key 110 to encrypt data 124 to form encrypted data 126, decrypt encrypted data 126 to form data 124, and so on. A variety of encryption/decryption techniques may be employed, including symmetrical and/or asymmetrical techniques. Consequently, the integrated circuit 102, and more particularly the functionality of the key generation module 108 and/or the encryption/decryption module 120 may be employed by a variety of devices, such as a communication device to communicate encrypted data and/or decrypt data that was encrypted for communication; a media storage device (e.g., a hard drive) to provide secure storage of data (an example of which is further described in relation to FIG. 3), and so on.

Figure 3:
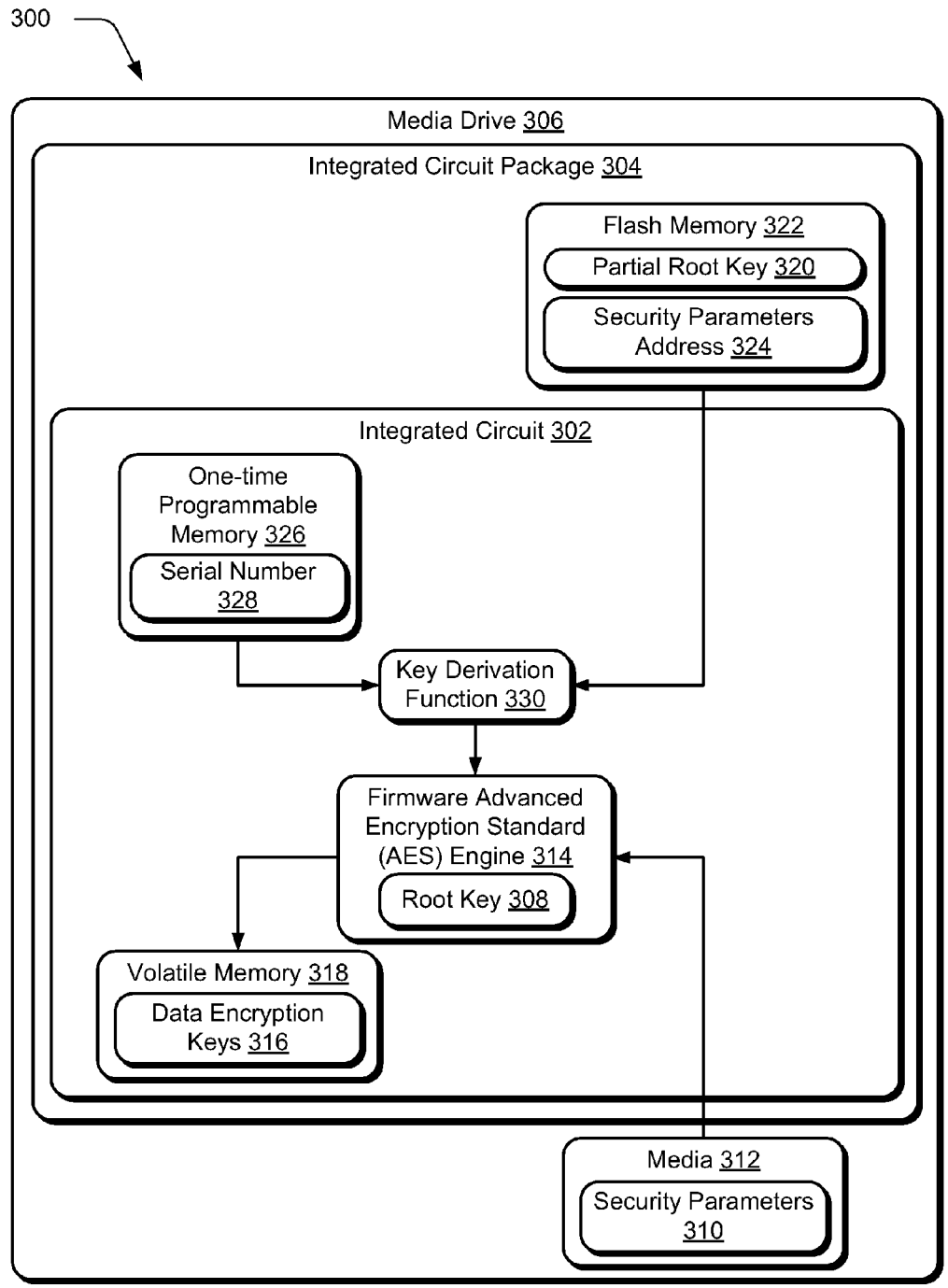
FIG. 3 is an illustration of an example implementation of an apparatus that incorporates an integrated circuit manufactured as described in relation to FIG. 2 that employs one or more key generation techniques.

Thus, in the example operational environment 100 of FIG. 1, portions (e.g., the first and second key portions 104, 106) used to generate the key 110 are "split" between programmable and nonvolatile memory (e.g., one-time programmable memory and flash memory 116) such that the key 110 itself is not stored in nonvolatile memory, further discussion of which may be found in relation to FIG. 3. Although the example operating environment 100 includes first and second key portions 104, 106, a variety of numbers of key portions and/or storage locations for the key portions are contemplated without departing from the scope of the techniques described herein.

Example Procedures

The following discussion describes key generation techniques that may be implemented utilizing the previously described systems and devices, as well as other systems and devices. Aspects of each of the procedures may be implemented in hardware, firmware, or software, or a combination thereof. The procedures are shown as a set of blocks that specify operations performed by one or more devices or users and are not necessarily limited to the orders shown for performing the operations by the respective blocks.

Figure 2:
FIG. 2 is a flow diagram that depicts a procedure in an example implementation in which an integrated circuit is manufactured and used to encrypt and/or decrypt data using a key generated by the integrated circuit.

FIG. 2 depicts a procedure 200 in an example implementation in which the integrated circuit 102 of FIG. 1 is manufactured and used to encrypt and/or decrypt data using a key generated by the integrated circuit 102. An integrated circuit is manufactured that has an encryption/decryption module 120 (e.g., configured in firmware and/or hardware) that is to encrypt or decrypt data using a key 110, a programmable memory 112 to store a first key portion 104, a memory interface 114 to receive a second key portion 106 and a key generation module 108 to generate the key 110 from the first key portion 104 and the second key portion 106 (block 202).

The programmable memory is then programmed with the first key portion (block 204), which may be performed in a variety of ways. For example, the first key portion 104 may correspond to a serial number of the integrated circuit 102 and may therefore be input at the time of manufacture of the integrated circuit 102.

In another example, the first key portion 104 may be input by a manufacturer of an apparatus that incorporates the integrated circuit 102, such as a communication device manufacturer, storage device manufacturer, and so on, an example of which is shown in FIG. 3. Thus, in this example the first key portion 104 is kept secret from a manufacturer of the integrated circuit 102.

In a further example, the first key portion 104 may be input by a user, such as through a user interface presented by a device that incorporates the integrated circuit 102. In this example, the first key portion 104 may therefore be kept secret from the integrated circuit manufacturer and the device manufacturer. A variety of other examples are also contemplated.

In the illustrated and described embodiment, a key 110 is generated using the first and second key portions (block 206). For example, the key 110 may be generated using a variety of techniques, such as through an XOR operation, use of one or more AES key generation algorithms, user of one or more NIST approved deterministic random number generation techniques that takes in the key portions as input key material to generate the key, and so on, further discussion of which may be found in relation to FIG. 3.

Data 124 is encrypted by the integrated circuit 102 using the encryption/decryption module 120 without exposing the key 110 to access outside of the integrated circuit (block 208). Likewise, data received by the integrated circuit may be decrypted using the encryption/decryption module 120 without exposing the key 110 to access outside of the integrated circuit (block 210). The key generation module 108, for instance, may be isolated from access outside of the integrated circuit 102, e.g., by lack of ports or other communication interfaces that may be used to directly access and/or modify the key generation module 108. Further, the key 110 may be stored in volatile memory of the encryption/decryption module 120 (e.g., within RAM that forms a part of the encryption/decryption module 120) such that the key 110 is not accessible when the encryption/decryption module 120 and/or the integrated circuit is off. A variety of other techniques may also be employed to prevent external access without departing from the spirit and scope thereof.

Implementation Examples

FIG. 3 illustrates an example implementation of an apparatus 300 that incorporates an integrated circuit 302 manufactured as described in relation to FIG. 2 that employs one or more key generation techniques. The integrated circuit 302 is illustrated as incorporated within an integrated circuit package 304 that is used by a media drive 306 to provide encryption and decryption.

The integrated circuit 302 is configured to utilize a root key 308 to decrypt security parameters 310 stored in media 312 of the media drive 306. The integrated circuit 302 in the illustrated instance utilizes a firmware Advanced Encryption Standard (AES) engine 314 with the root key 308 to derive data encryption keys 316 that are illustrated as being stored in volatile memory 318. For example, the root key 308 may be implemented as a cipher key that is used for encrypting each of the security parameters 310 of the media drive 306. In accordance with an NIST Standard for AES Key Wrapping, the root key 308 may be configured as a Key-Encryption-Key (KEK) which is used to encrypt data encryption keys 316, which are illustrated as stored in volatile memory 318. The data encryption keys 316 may be used for a variety of purposes, such as to encrypt user data in different Logical Block Address (LBA) ranges of the media 312.

A partial root key 320 is illustrated as stored in non-volatile flash memory 322 (e.g., an information page of the flash memory 322), which may be "stacked above" the integrated circuit 302 (e.g., when configured as a system-on-chip (SoC)) of the integrated circuit package 304. In the illustrated implementation, a security parameters address 324 is also stored in the flash memory 322 to locate the security parameters 310 in the media 312. In another implementation, however, the security parameters 310 may also be stored in the flash memory 322.

In this particular example, the integrated circuit 302 also includes a one-time programmable memory 326 that includes a serial number 328 (e.g., a serial number of the integrated circuit 302, integrated circuit package 304 and/or media drive 306) that is used in combination with the partial root key 320 to derive the root key 308, further discussion of which may be found in relation to the following figure.

Figure 4:
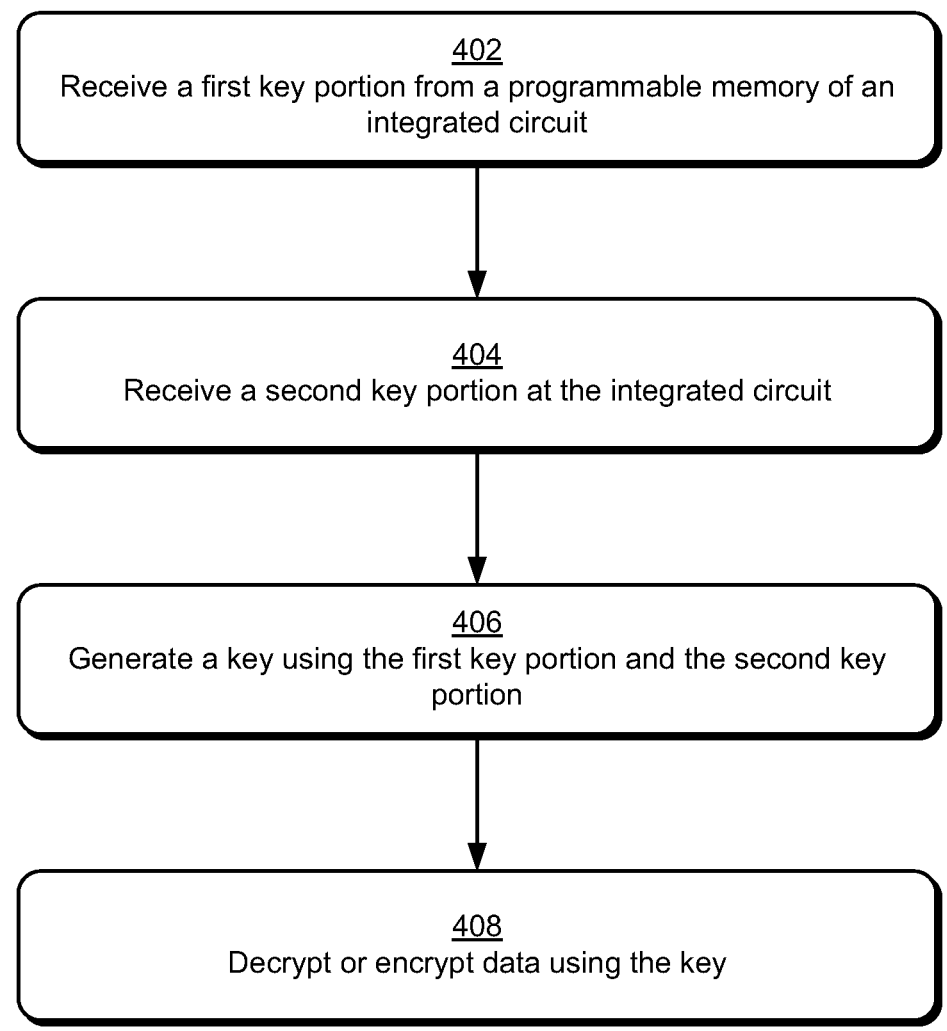
FIG. 4 is a flow diagram that depicts a procedure in an example implementation in which a key is generated from first and second key portions and used to encrypt or decrypt data.

FIG. 4 depicts a procedure 400 in an example implementation in which a key is generated from first and second key portions and used to encrypt or decrypt data. A first key portion is received from a programmable memory of an integrated circuit (block 402) and a second key portion is received at the integrated circuit (block 404). Continuing with the example of FIG. 3, the partial root key 320 may be received from flash memory 322 included in the integrated circuit package 304, and thus in this example the partial root key 320 corresponds to the second key portion.

The serial number 328 in this example corresponds to the first key portion, and may be configured in a variety of ways. The serial number 328, for example, may be received from one-time programmable memory 326 of the integrated circuit. The serial number 328 may be a logical grouping of bits that are stored using one or more registers of the one-time programmable memory 326. Thus, once the bits of the serial number 328 are set in the one-time programmable memory 326, the bits cannot be modified, thus "fixing" the serial number 328 for the life of the integrated circuit 302.

A key is generated using the first key portion and the second key portion (block 406). Continuing with the previous example, the root key 308 is a cipher key used to encrypt and decrypt security parameters 310. The partial root key 302 is combined with the serial number 328 to recover the root key 308 by a key derivation function 330, such as through an XOR operation, NIST approved key derivation function, and so on.

Once the root key 308 is generated, which is a key-encryption-key (KEK) in this example, the root key 308 is loaded into the firmware AES engine 314 to decrypt or encrypt data using the key (block 408). For example, the firmware AES engine 314 may use the root key 308 to perform key unwrapping by first locating the security parameters address 324 in the flash memory 322. This address may then be used by the AES engine 314 (e.g., in firmware and/or hardware) to load the security parameters 310 from the media 312, which may then be decrypted into data encryption keys 316. The data encryption keys 316, for instance, may be configured as one or more security parameter tables (including a table of encryption keys for different LBA ranges) that are stored in the volatile memory 318.

Thus, in this example, the partial root key 320 is stored in flash memory 322 such that even if a malicious party successfully "decaps" the integrated circuit package 304 to access the flash memory 322, just the partial root key 320 and the security parameters address 324 may be recovered. The malicious party, however, is not able to retrieve the serial number 328 from the one-time programmable memory 326 and therefore is not able to decrypt (e.g., unwrap) the security parameters 310. In an implementation, the serial number 328 is readable by firmware of the integrated circuit 302 (e.g., firmware used to implement the key generation module 108), but the firmware is secured by one-time-programmable lockout of each access port of the integrated circuit 302, e.g., which configured as a system-on-chip (SoC). Similarly, the data encryption keys 316 are further protected within the integrated circuit 302 (e.g., a SoC) due to the volatile nature of the memory 318, e.g., erasure of the data encryption keys 316 through hard resets or power cycles. A variety of other examples are also contemplated, such as by disabling debug ports of the integrated circuit 302.

Figure 5:
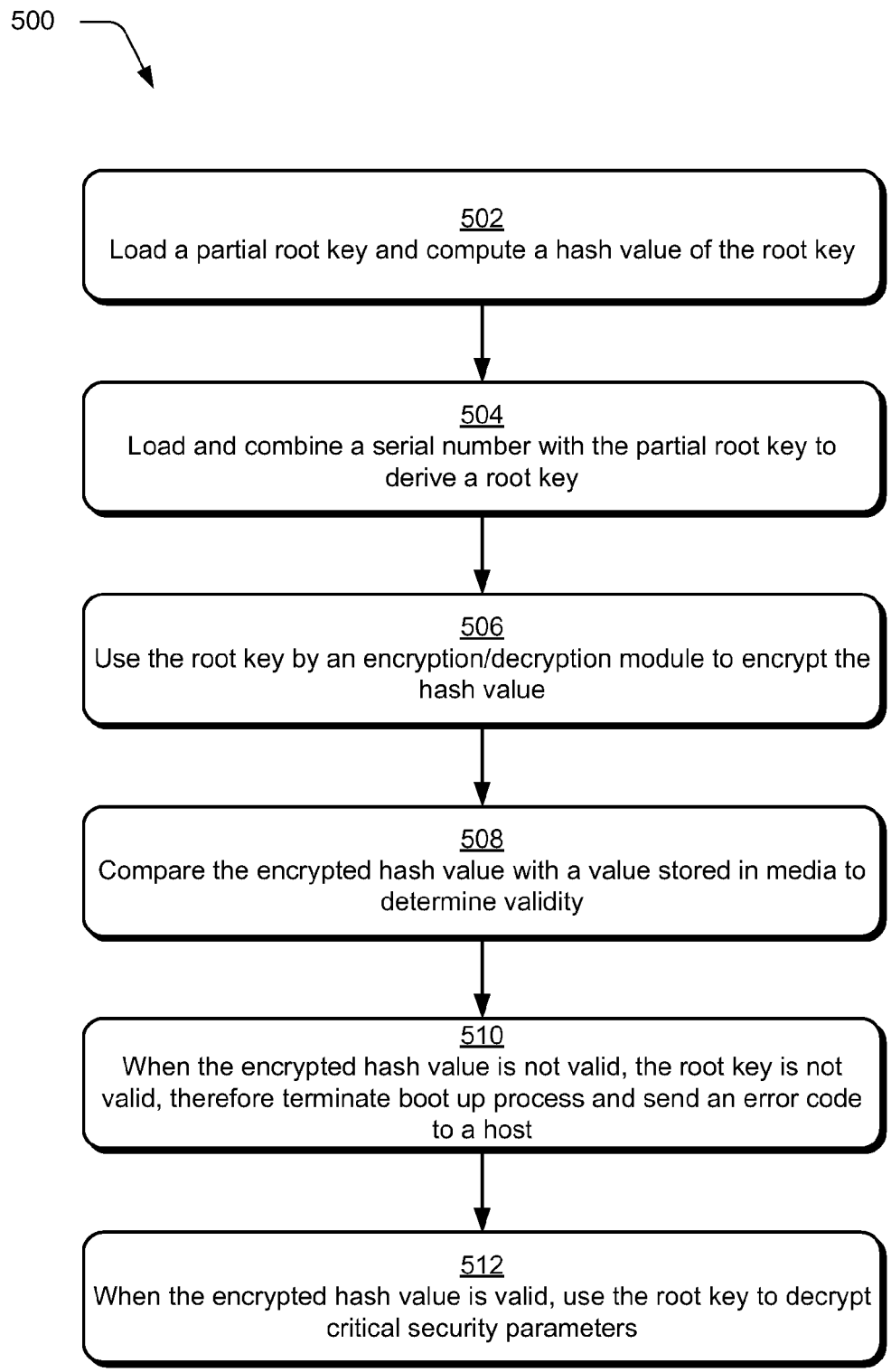
FIG. 5 is a flow diagram that depicts a procedure in an example implementation in which a root key of FIG. 3 is verified upon boot-up.

FIG. 5 depicts a procedure 500 in an example implementation in which the root key 308 of FIG. 3 is verified upon boot-up of the integrated circuit 302. During manufacture of the media drive 306 and/or integrated circuit 302, functionality may be implemented to help ensure future validity of the root key 308. For example, the partial root key 320 stored on the flash memory 322 may include a plurality of bits (e.g., 128 bits) that are randomly generated during manufacture, and may be input at the same time as the serial number 328. A hash value of the partial root key 320 (e.g., using SHA-256) may then be computed and encrypted by the root key 308 and stored on the media 312 of the media drive 306. This hash value may then be used for integrity checking of the particular root key 320 in future boot processes, further discussion of which may be found in relation to the following blocks. Alternatively, the hash value may also be written to a one-time-programmable register and the integrity of the partial root key in the flash is checked (using this stored hash value) prior to key generation.

The serial number 328 in the one-time programmable memory 326 may be configured in a variety of ways as previously described in relation to FIG. 2, such as by being burned during a manufacturing phase of the integrated circuit 302. This may be beneficial in that the serial number 328 may be considered a random string (e.g., 128 bits) that is generated within a system-on-chip (SoC), knowledge of which is not provided to a device manufacturer (e.g., media drive 306 manufacturer) or even SoC manufacturer. Thus, the serial number may provide a one-time pad for encryption purposes. A variety of other techniques may also be performed, such as through use of a 32 bit serial number that may be "XORed" to the partial root key 320, a NIST approved key derivation function using a concatenated serial number 328 and the partial root key 320 to derive the root key 308, and so on.

During a boot process, a partial root key is loaded and a hash value is computed of the root key (block 502), such as by using a SHA-256 hashing algorithm. A serial number 328 is loaded and combined with the partial root key 320 to derive the root key 308 (block 504). The root key is then used by the encryption/decryption module 120 to encrypt the hash value (block 506).

The encrypted hash value is then compared with a value stored in media to determine validity (block 508), such as the encrypted hash value that was stored as previously described. When the encrypted hash value is not valid, the root key is not valid, therefore the boot-up process is terminated and an error code is sent to a host (block 510). When the encrypted hash value is valid, the root key 308 is used to decrypt security parameters 310 (block 512) as previously described in relation to FIGS. 3 and 4.

Figure 6:
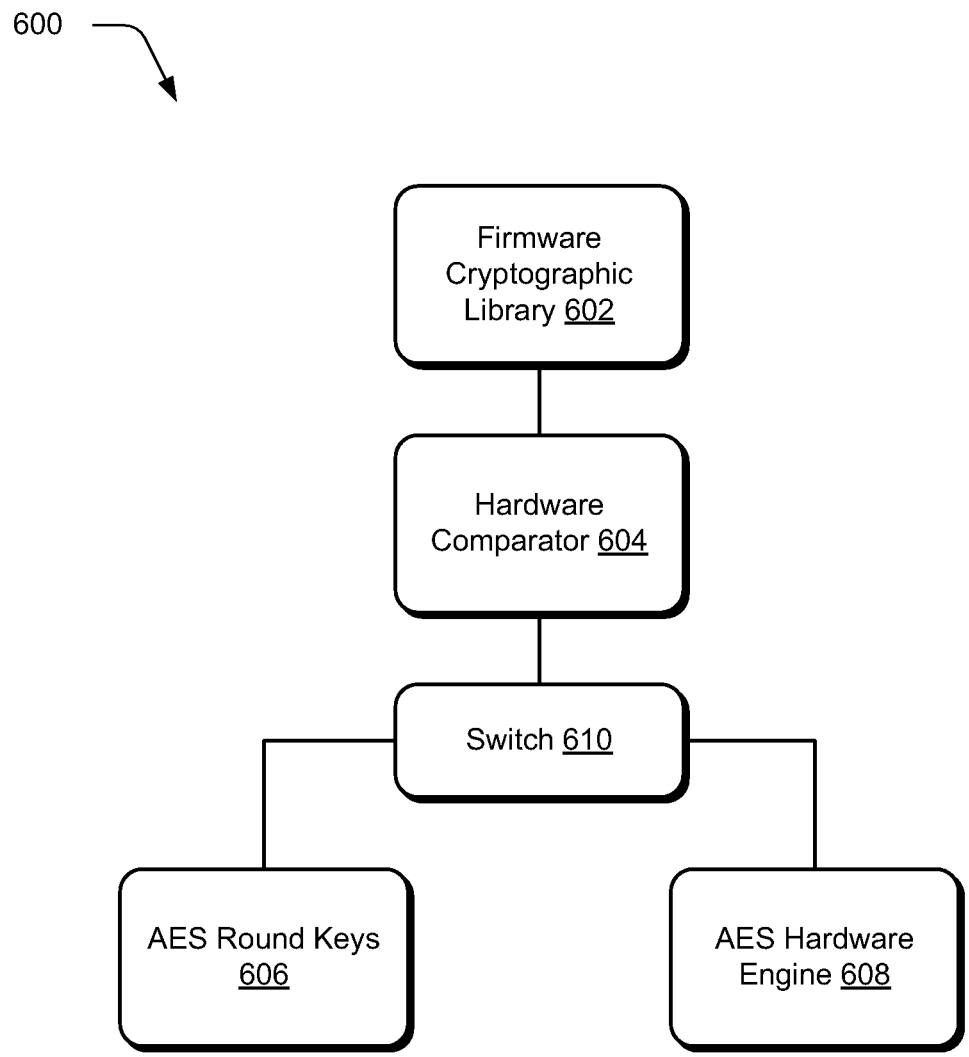
FIG. 6 is an illustration of an example system in which digital signature verification is divided into two parts to discourage a warehouse attack on firmware used to implement encryption/decryption of an integrated circuit.

FIG. 6 depicts a system 600 in an example implementation in which digital signature verification is performed to discourage a warehouse attack on firmware used to implement encryption/decryption of the integrated circuit 102. Reliance on firmware to perform cryptographic tasks may open up a security vulnerability of a warehouse attack, in which malicious firmware that is installed may be configured to bypass verification as described in relation to FIG. 5.

The system 600 depicts a technique that may be employed to foil such an attack, in which digital signature verification is divided into two parts. A first part, firmware cryptographic library 602, includes a firmware component that loads an incoming digital signature, hashes an incoming message contained in the signature, and performs encryption using an asymmetric algorithm, e.g., RSA. A second part, hardware comparator 604, includes hardware that performs a comparison of the encrypted hashed message with the stored value.

In the illustrated example, the hardware comparator 604 controls a bit register that determines whether AES round keys 606 are accessible (e.g., visible) to an AES hardware engine 608, e.g., through use of a switch 610. In an implementation, this bit register is not accessible by firmware and is controlled by the hardware comparator 604 alone.

If malicious firmware attempts to bypass authentication, the AES round keys 606 are not made available to the AES hardware engine 608. Instead, there may be a default set of rounds keys that are made accessible to the AES hardware engine 608. Therefore, in such an instance data that is output is decrypted with the "wrong" keys thus providing useless data.

In another implementation, the AES hardware engine 608 may be stalled by refusing access to the correct AES round keys 606, and an error message is sent back to a host to request another round of authentication. If this repeats for more than a certain number of times, a tamper-resistant response may be activated by "zeroing out" each key and sending a message to the host. The message may request that the device (e.g., the media drive 306) be brought into the manufacturer for failure analysis and/or reloading of firmware.

FIGS. 7-13 illustrate some examples of various devices that can each be implemented as any form of a device to implement various embodiments of the previously described key generation techniques. For example, any of the various devices can be implemented as a device that uses encryption and/or decryption using the generated key. The techniques may be employed within signal processing and/or control functionality of the devices, examples of which are as follows.

Figure 7:
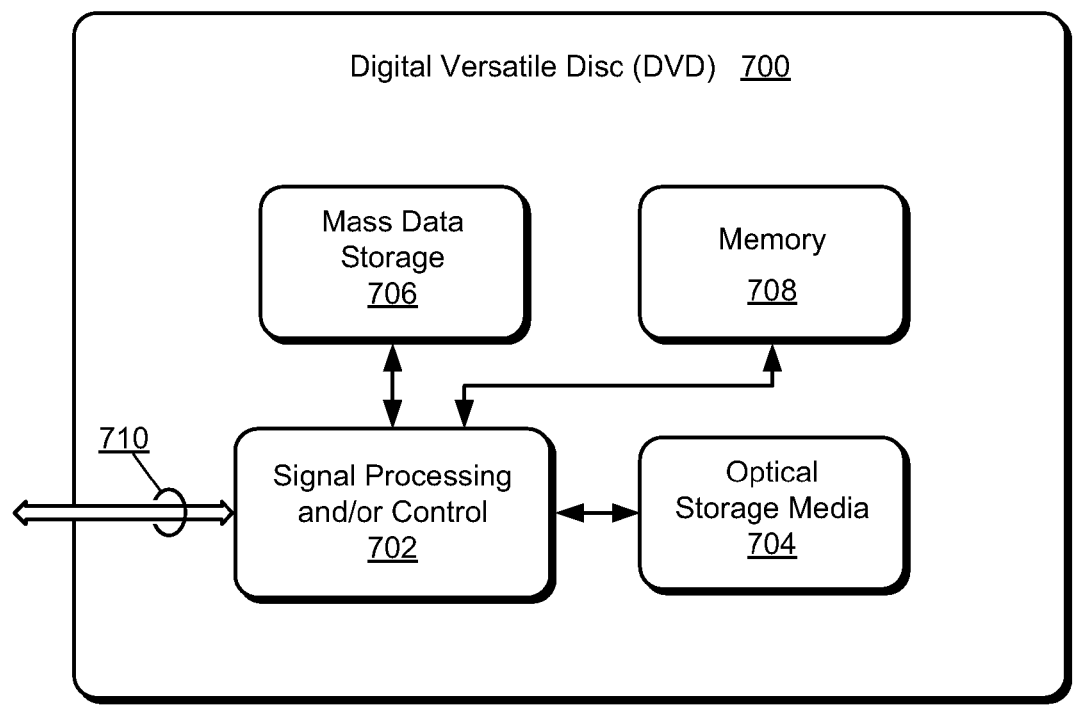
FIGS. 7-13 illustrate some examples of various devices that can each be implemented as a device that employs encryption/decryption techniques that leverage the previously described key generation techniques.

FIG. 7 illustrates an example device that may be embodied as a digital versatile disc (DVD) drive 700, which includes signal processing and/or control circuit(s) generally identified at 702. The DVD drive 700 can also include an optical storage media 704, mass data storage 706, and/or a memory 708, such as random access memory (RAM), a low-latency nonvolatile memory such as flash memory, read only memory (ROM), and/or other suitable electronic data storage. The mass data storage 706 can store data in a nonvolatile manner, and may include a hard disk drive (HDD) (or media drive) such as described with reference to FIG. 3, which may be a mini HDD that includes one or more platters having a diameter that is smaller than approximately 1.8 inches.

In various implementations, the signal processing and/or control circuit(s) 702 can be implemented to process data (e.g., any of encoding, decoding, encryption, and/or decryption), perform data calculations, format data, and/or any other signal processing functions associated with a DVD drive. The data can be written to and/or read from at least the optical storage media 704 and/or the memory 708. In addition, the DVD drive 700 can communicate with an output device (not shown) such as a computer, television, and/or other devices via one or more wired or wireless communication links 710. Data communicated by the device, whether internally or externally, may be encrypted and/or decrypted using the previously described techniques as represented by the signal processing and/or control 702.

Figure 8:
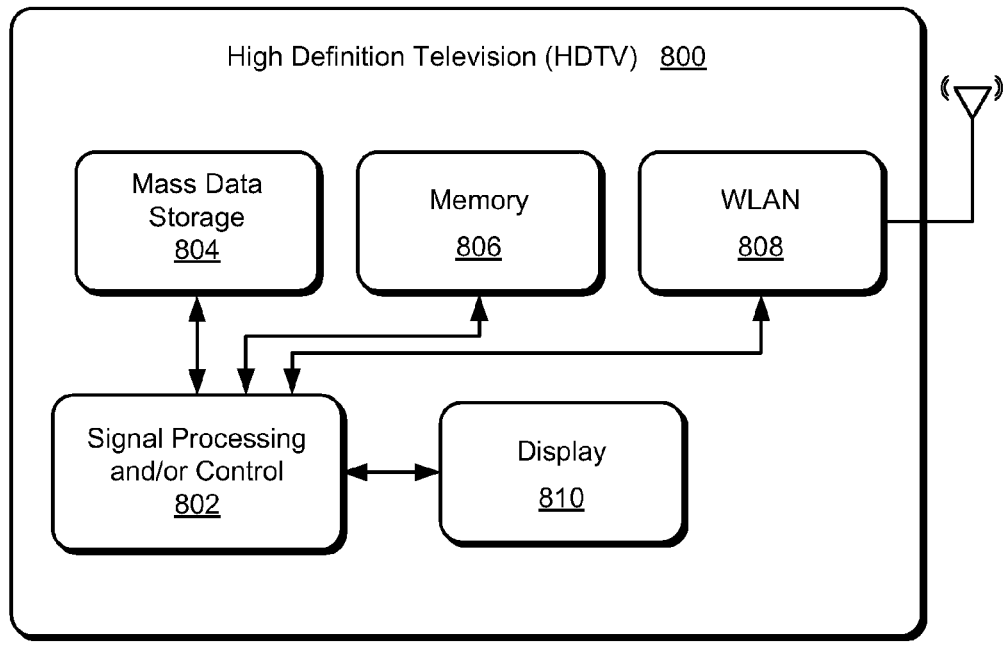

FIG. 8 illustrates an example device that may be embodied as a high definition television (HDTV) 800, which includes signal processing and/or control circuit(s) generally identified at 802. The HDTV 800 can also include mass data storage 804 and/or a memory 806, such as random access memory (RAM), a low-latency nonvolatile memory such as flash memory, read only memory (ROM), and/or other suitable electronic data storage. The mass data storage 804 can store data in a nonvolatile manner, and may include an optical storage media as described with reference to FIG. 7, and/or a media drive such as described with reference to FIG. 3, which may be a mini HDD that includes one or more platters having a diameter that is smaller than approximately 1.8 inches.

In various implementations, the signal processing and/or control circuit(s) 802 can be implemented to process data (e.g., any of encoding, decoding, encryption, and/or decryption), perform data calculations, format data, and/or any other signal processing functions associated with an HDTV. The data can be output to and/or received from at least the memory

806. In addition, the HDTV 800 includes a wireless local area network (WLAN) interface 808 via which input signals can be received in either a wired or wireless format. HDTV output signals can be generated for a display 810. Data communicated by the device, whether internally or externally, may be encrypted and/or decrypted using the previously described techniques as represented by the signal processing and/or control 802.

Figure 9:
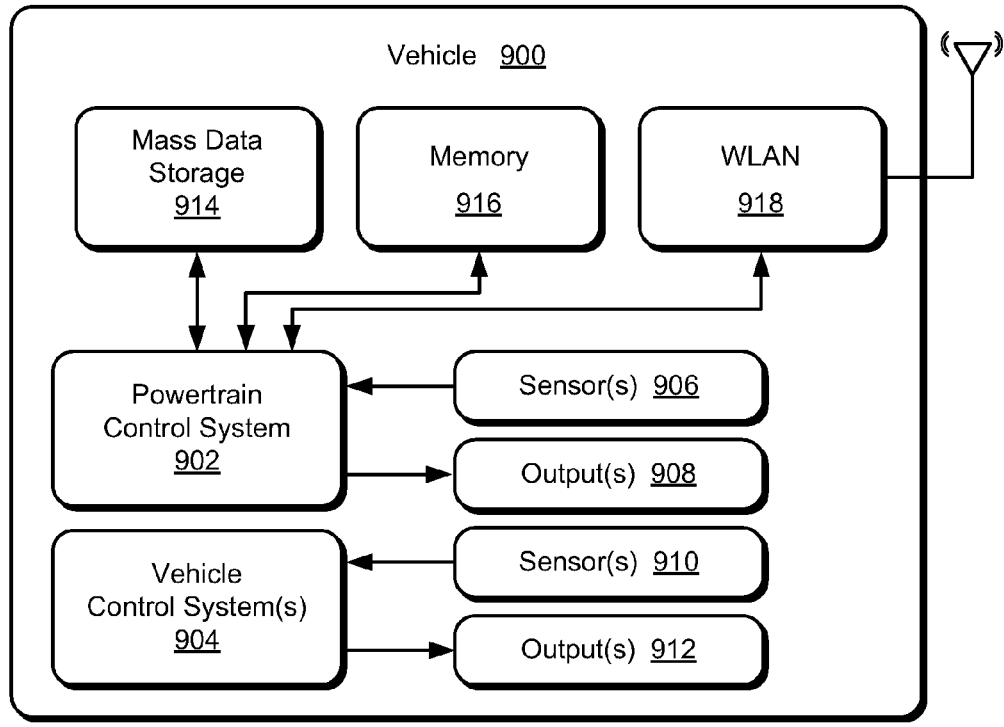

FIG. 9 illustrates an example device that may be embodied as a vehicle 900, which includes a powertrain control system 902 and, optionally, additional vehicle control system(s) 904. The powertrain control system 902 can receive data inputs from one or more sensors 906 such as temperature sensors, pressure sensors, rotational sensors, airflow sensors, and/or any other suitable sensors. The powertrain control system 902 can receive the data inputs and generate one or more output control signals 908, such as engine operating parameters, transmission operating parameters, braking parameters, and/or other control signals.

Additional control system(s) 904 may likewise receive data signals from one or more input sensors 910 and/or generate output control signals 912 to one or more output devices. In various implementations, a control system 904 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 900 can also include mass data storage 914 and/or a memory 916, such as random access memory (RAM), a low-latency nonvolatile memory such as flash memory, read only memory (ROM), and/or other suitable electronic data storage. The mass data storage 914 can store data in a nonvolatile manner, and may include an optical storage media as described with reference to FIG. 7, and/or a media drive such as described with reference to FIG. 3, which may be a mini HDD that includes one or more platters having a diameter that is smaller than approximately 1.8 inches. In addition, vehicle 900 includes a wireless local area network (WLAN) interface 918 via which input signals can be received in either a wired or wireless format. The powertrain control system 902 also may support connections with a WLAN via the WLAN interface 918. Data communicated by the device, whether internally or externally, may be encrypted and/or decrypted using the previously described techniques as represented by the signal processing and/or control 902.

Figure 10:
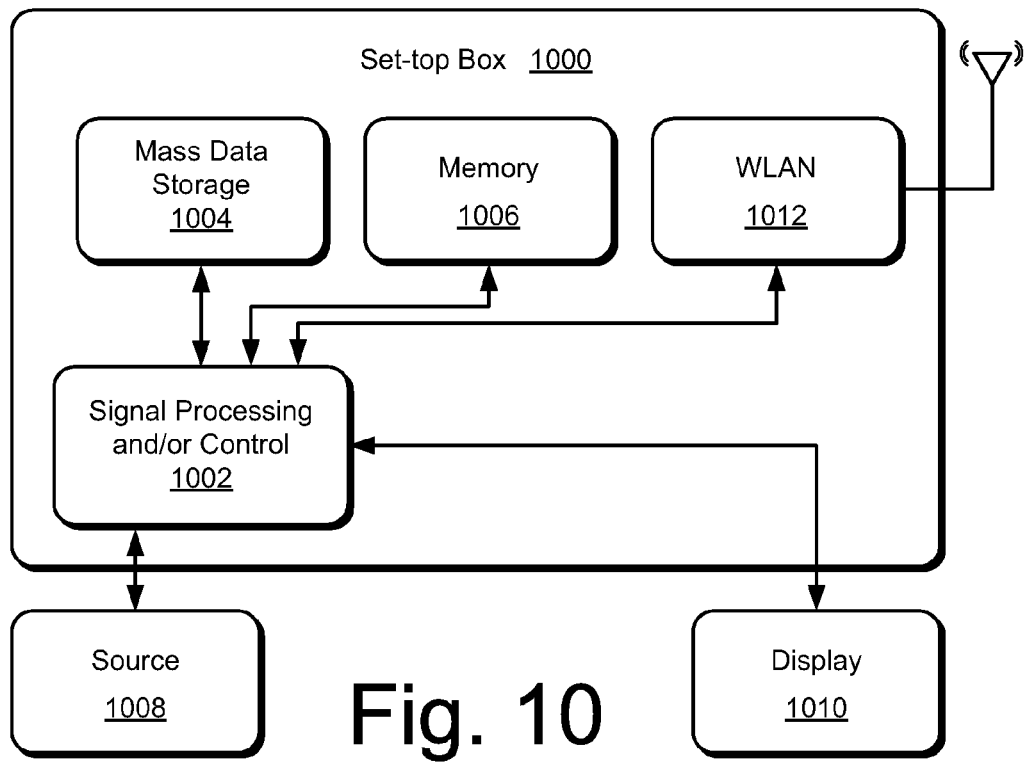

FIG. 10 illustrates an example device that may be embodied as a television set-top box 1000, which includes signal processing and/or control circuit(s) generally identified at 1002. The set-top box 1000 can also include mass data storage 1004 and/or a memory 1006, such as random access memory (RAM), a low-latency nonvolatile memory such as flash memory, read only memory (ROM), and/or other suitable electronic data storage. The mass data storage 1004 can store data in a nonvolatile manner, and may include an optical storage media as described with reference to FIG. 7, and/or a media drive such as described with reference to FIG. 3, which may be a mini HDD that includes one or more platters having a diameter that is smaller than approximately 1.8 inches.

The set top box 1000 can receive data signals from a source 1008, such as a broadband source, and can then output standard and/or high definition audio/video signals suitable for a display 1010, such as a television, monitor, and/or other video and/or audio output devices. In various implementations, the signal processing and/or control circuit(s) 1002 can be implemented to process data (e.g., any of encoding, decoding, encryption, and/or decryption), perform data calculations, format data, and/or any other signal processing functions associated with a television set-top box. The data can be output to and/or received from at least the memory 1006 and/or the source 1008. In addition, the set-top box 1000 includes a wireless local area network (WLAN) interface 1012 via which input signals can be received in either a wired or wireless format. The set-top box 1000 may also support connections with a WLAN via the WLAN interface 1012. Data communicated by the device, whether internally or externally, may be encrypted and/or decrypted using the previously described techniques as represented by the signal processing and/or control 1002.

Figure 11:
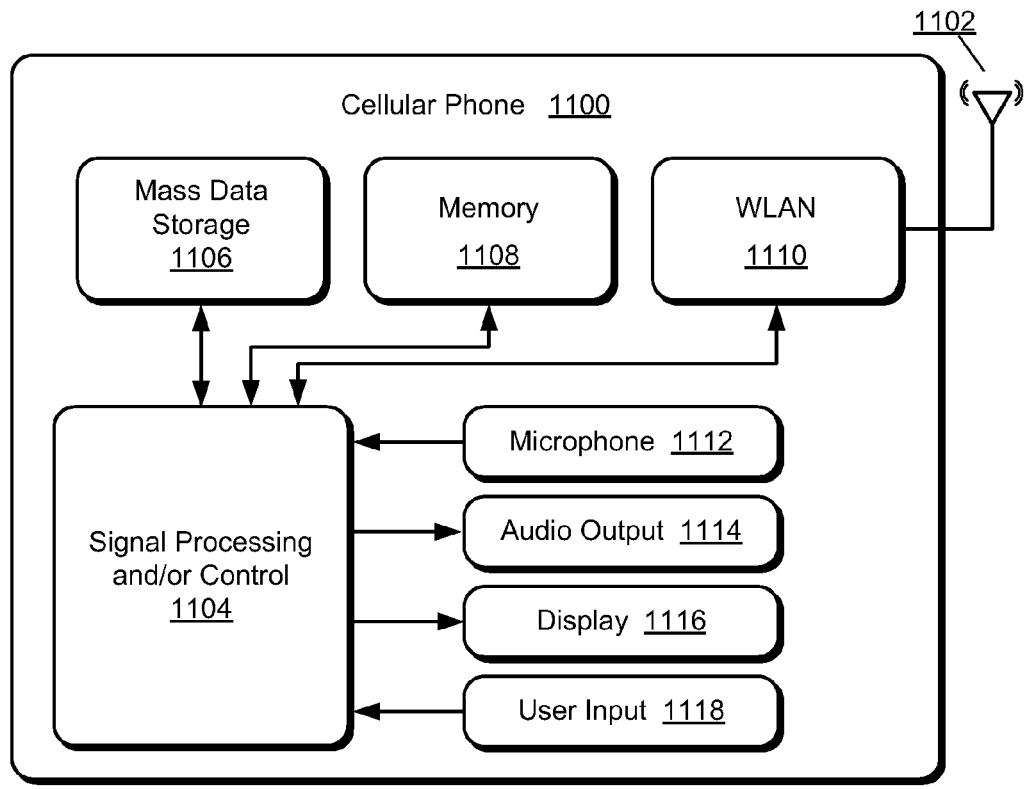

FIG. 11 illustrates an example node device that may be embodied as a cellular phone 1100, which includes a cellular antenna 1102 and signal processing and/or control circuit(s) generally identified at 1104. The cellular phone 1100 can also include mass data storage 1106 and/or a memory 1108, such as random access memory (RAM), a low-latency nonvolatile memory such as flash memory, read only memory (ROM), and/or other suitable electronic data storage. The mass data storage 1106 can store data in a nonvolatile manner, and may include an optical storage media as described with reference to FIG. 7, and/or a media drive such as described with reference to FIG. 3, which may be a mini HDD that includes one or more platters having a diameter that is smaller than approximately 1.8 inches.

In various implementations, the signal processing and/or control circuit(s) 1104 can be implemented to process data (e.g., any of encoding, decoding, encryption, and/or decryption), perform data calculations, format data, and/or any other signal processing functions associated with a cellular phone. The data can be output to and/or received from at least the memory 1108. In addition, the cellular phone 1100 includes a wireless local area network (WLAN) interface 1110 via which input signals can be received in a wireless format. The cellular phone 1100 may also support connections with a WLAN via the WLAN interface 1110. In some implementations, the cellular phone 1100 can include a microphone 1112, an audio output 1114 such as a speaker and/or audio output jack, a display 1116, and/or an input device 1118 such as a keypad, pointing device, voice actuation, and/or other input device. Data communicated by the device, whether internally or externally, may be encrypted and/or decrypted using the previously described techniques as represented by the signal processing and/or control 1102.

Figure 12:
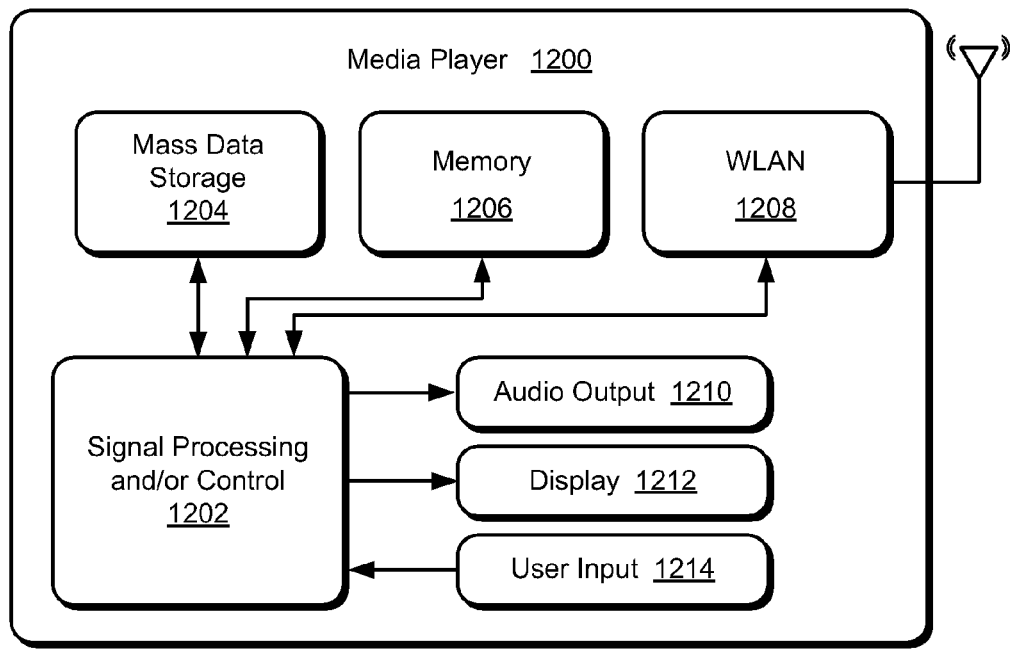

FIG. 12 illustrates an example device that may be embodied as a media player 1200, which includes signal processing and/or control circuit(s) generally identified at 1202. The media player 1200 can also include mass data storage 1204 and/or a memory 1206, such as random access memory (RAM), a low-latency nonvolatile memory such as flash memory, read only memory (ROM), and/or other suitable electronic data storage. The mass data storage 1204 can store data, such as compressed audio and/or video content, in a nonvolatile manner. In some implementations, compressed audio files include files that are compliant with an MP3 format or other suitable compressed audio and/or video formats. The mass data storage 1204 may include an optical storage media as described with reference to FIG. 7, and/or a media drive such as described with reference to FIG. 3, which may be a mini HDD that includes one or more platters having a diameter that is smaller than approximately 1.8 inches.

In various implementations, the signal processing and/or control circuit(s) 1202 can be implemented to process data (e.g., any of encoding, decoding, encryption, and/or decryption), perform data calculations, format data, and/or any other signal processing functions associated with a media player.

The data can be output to and/or received from at least the memory 1206. In addition, the media player 1200 includes a wireless local area network (WLAN) interface 1208 via which input signals can be received in either a wired or wireless format. The media player 1200 may also support connections with a WLAN via the WLAN interface 1208. In some implementations, the media player 1200 can include an audio output 1210 such as a speaker and/or audio output jack, a display 1212, and/or an input device 1214 such as a keypad, touchpad, pointing device, voice actuation, and/or other input device. In various implementations, media player 1200 may employ a graphical user interface (GUI) that typically includes menus, drop down menus, icons, and/or a point-and-click interface via display 1212 and/or user input 1214. Data communicated by the device, whether internally or externally, may be encrypted and/or decrypted using the previously described techniques as represented by the signal processing and/or control 1202.

Figure 13:
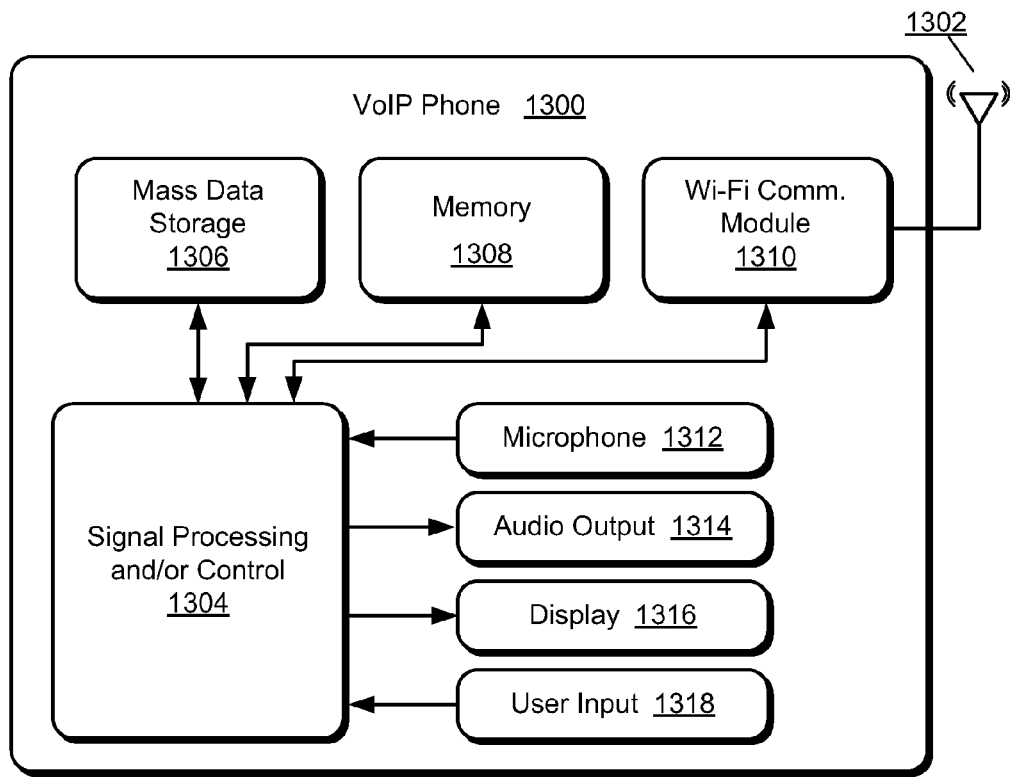

FIG. 13 illustrates an example node device that may be embodied as a Voice over Internet Protocol (VoIP) phone 1300, which includes an antenna 1302 and/or is implemented in connection with a VoIP box that enables a conventional telephone to be plugged in and utilized with VoIP technology. The VoIP phone 1300 also includes signal processing and/or control circuit(s) generally identified at 1304. The VoIP phone 1300 can also include mass data storage 1306 and/or a memory 1308, such as random access memory (RAM), a low-latency nonvolatile memory such as flash memory, read only memory (ROM), and/or other suitable electronic data storage. The mass data storage 1306 can store data in a non-volatile manner, and may include an optical storage media as described with reference to FIG. 7, and/or a media drive such as described with reference to FIG. 3, which may be a mini HDD that includes one or more platters having a diameter that is smaller than approximately 1.8 inches.

In various implementations, the signal processing and/or control circuit(s) 1304 can be implemented to process data (e.g., any of encoding, decoding, encryption, and/or decryption), perform data calculations, format data, and/or any other signal processing functions associated with a VoIP phone. The data can be output to and/or received from at least the memory 1308. In addition, the VoIP phone 1300 includes a Wireless Fidelity (Wi-Fi) communication module 1310 via which communication links with a VoIP network can be established. In some implementations, the VoIP phone 1300 can include a microphone 1312, an audio output 1314 such as a speaker and/or audio output jack, a display 1316, and/or an input device 1318 such as a keypad, pointing device, voice actuation, and/or other input device. Data communicated by the device, whether internally or externally, may be encrypted and/or decrypted using the previously described techniques as represented by the signal processing and/or control 1302.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A System-on-Chip (SoC) comprising:
   a memory interface;
   a one-time programmable memory to maintain a first key portion, wherein the first key portion is based on a serial number of the SoC that is not accessible from outside of the SoC;
   a flash memory maintaining a second key portion, the flash memory stacked above the SoC within a package of the SoC effective to render the one-time programmable memory of the SoC inaccessible if the SoC package is physically accessed;
   a key generation module to generate a key using the first key portion received from the one-time programmable memory and the second key portion received from the flash memory via the memory interface; and
   a module to encrypt or decrypt data using the key.

2. The SoC as described in claim 1, wherein the one-time programmable memory is to store the first key portion during manufacture of the SoC.

3. The SoC as described in claim 2 further comprising a deterministic random bit generator configured to generate a value useful to create the first key portion during the manufacture of the SoC.

4. The SoC as described in claim 1, wherein the serial number of the SoC is not accessible by an apparatus that includes the SoC.

5. The SoC as described in claim 1, wherein physically accessing the SoC includes de-capping the package of the SoC.

6. The SoC as described in claim 1, wherein the key generation module is implemented using firmware or hardware, the firmware or hardware prevented from accessing the one-time programmable memory when a data or debug port of the SoC is open.

7. The SoC as described in claim 1 further comprising volatile memory and wherein:
   the module is to perform one or more techniques in accordance with an National Institute of Standards and Technology (NIST) Standard for Advanced Encryption Standard (AES) Key Wrapping;
   the key is a root key; and
   the data includes security parameters written to the volatile memory of the SoC.

8. The SoC as described in claim 7, wherein the security parameters include a plurality of encryption keys, each for a different range of Logical Block Addresses (LBA).

9. The SoC as described in claim 1, wherein physically accessing the SoC includes attempting to physically access or remove the flash memory.

10. The SoC as described in claim 1 further comprising non-volatile flash memory communicatively coupled with the memory interface, the non-volatile flash memory maintaining the second key portion.

11. An apparatus including the SoC as described in claim 1, further comprising media communicatively coupled to the module of the SoC to store data encrypted by the module.

12. The apparatus including the SoC as described in claim 11, wherein the SoC and the media form at least a portion of a hard disk drive.

13. A method comprising:
   receiving a first key portion of a root key from a one-time programmable memory of a System-on-Chip (SoC), wherein the first key portion of the root key is not an entire root key and is based on a serial number of the SoC;
   receiving a second key portion of the root key from a flash memory of the SoC, the second key portion of the root key not being an entire root key, the flash memory of the SoC positioned within a package of the SoC effective to render the one-time programmable memory of the SoC inaccessible if the flash memory is physically accessed;
   generating a root key using the first key portion and the second key portion of the root key; and decrypting or encrypting another set of keys using the root key, the other set of keys useful to decrypt or encrypt data.

14. The method as described in claim 13, wherein the second key portion is received via a memory interface of the SoC and the memory interface communicatively couples the SoC with a key generation module of the SoC that performs the generating.

15. The method as described in claim 13, wherein the first key portion of the root key is written to the one-time programmable memory during manufacture of the SoC.

16. The method as described in claim 13, further comprising deleting the other set of keys in response to a power cycle or reset event.

17. The method as described in claim 13, wherein the other set of keys includes a plurality of encryption keys stored in volatile memory of the SoC, each for a different range of Logical Block Addresses (LBA).

18. The method as described in claim 17, further comprising disabling access to the volatile memory of the SoC in response to the SoC entering a mode in which data or debug ports of the SoC are accessible.

19. A media drive comprising:
    computer-readable media configured to store encrypted data, the computer-readable media maintaining an encrypted hash value based on a first key portion;
    a System-on-Chip (SoC) configured to control access to the computer-readable media of the media drive, the SoC including:
        a flash memory to maintain the first key portion;
        a one-time programmable memory to maintain a second key portion, wherein the second key portion is based on a serial number of the SoC that is not accessible from outside of the SoC, the flash memory stacked above the SoC within a package of the SoC effective to render the one-time programmable memory inaccessible if the SoC package is physically accessed;
        a key generation module to generate a key using the first key portion and the second key portion;
        an encryption module configured to:
            compute a local hash value based on the first key portion;
            encrypt the local hash value using the key to provide a local encrypted hash value; and
            allow access to the computer-readable media of the media drive if the local encrypted hash value matches the encrypted hash value maintained by the computer-readable media; or
            prevent access to the computer-readable media of the media drive.

20. The media drive of claim 19, wherein the first key portion and the second key portion are portions of a root key.

* * * * *